United States Patent [19]

Walczak

[11] Patent Number: 5,044,597

[45] Date of Patent: Sep. 3, 1991

[54] REMOVABLE ANCHOR FOR REMOVABLY RECEIVING AND SUPPORTING AN EXTERNAL MEMBER

[76] Inventor: Lester S. Walczak, 832 Oakwood Dr., Westmont, Ill. 60559

[21] Appl. No.: 467,926

[22] Filed: Jan. 22, 1990

[51] Int. Cl.$^5$ .............................................. F16M 13/00
[52] U.S. Cl. ................................... 248/530; 248/512; 248/545; 248/156; 43/21.2
[58] Field of Search ............... 248/512, 530–533, 248/545, 156; 52/155, 165, 198; 43/21.2

[56] References Cited

U.S. PATENT DOCUMENTS

| | | | |
|---|---|---|---|
| 1,362,238 | 12/1920 | Dietz | 52/165 X |
| 1,952,789 | 3/1934 | Butts | 248/533 |
| 3,021,101 | 2/1962 | Gliebe | 248/532 |
| 3,339,869 | 9/1967 | Andersen | 248/532 |
| 4,104,823 | 8/1978 | Jakl et al. | 52/155 X |
| 4,712,762 | 12/1987 | Gedle | 248/533 |

FOREIGN PATENT DOCUMENTS 1088975 3/1955 France .................................. 43/21.2

Primary Examiner—Alvin C. Chin-Shue
Attorney, Agent, or Firm—William J. Michals

[57] ABSTRACT

A receptacle device for removably receiving an supporting an external utilization device such as a rod or a fishing pole. The device includes an generally tubular receptacle body of electrically insulating material extending in a longitudinal direction having a receiving opening at one end thereof. The body includes a support opening the axis of which is parallel to and spaced apart from the axis of the receiving opening. A rigid longitudinally extending support shaft is received within the support opening which rigidly extends away from the receptacle body at the support opening for anchoring the receptacle device into and through an opening of an external surface such as the surface of the earth or the rod holder of a recreational boat.

18 Claims, 2 Drawing Sheets

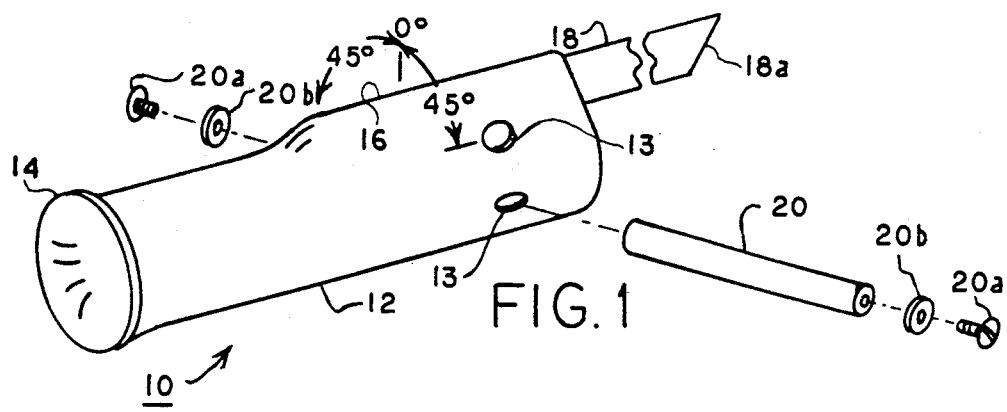
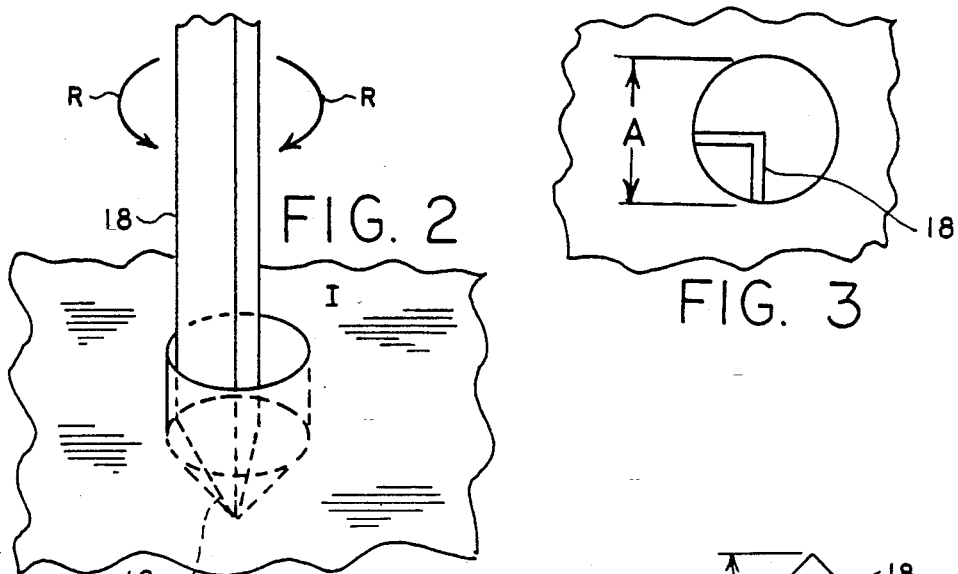
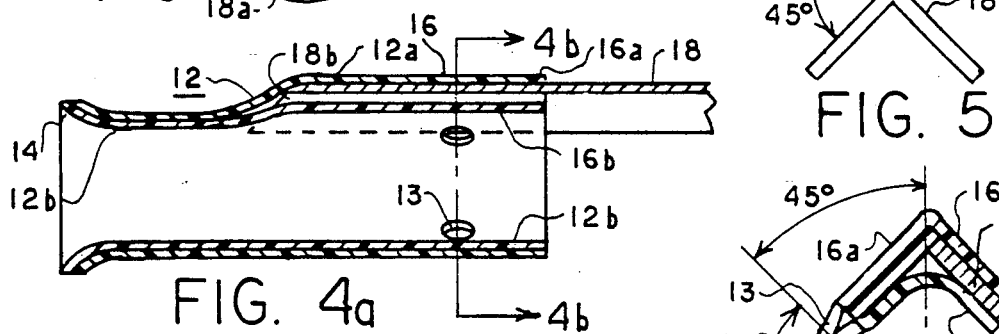
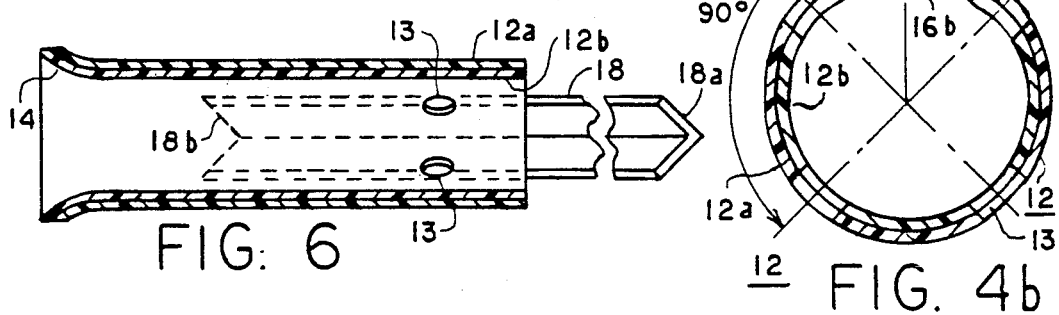

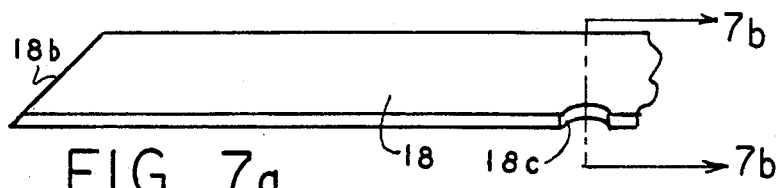
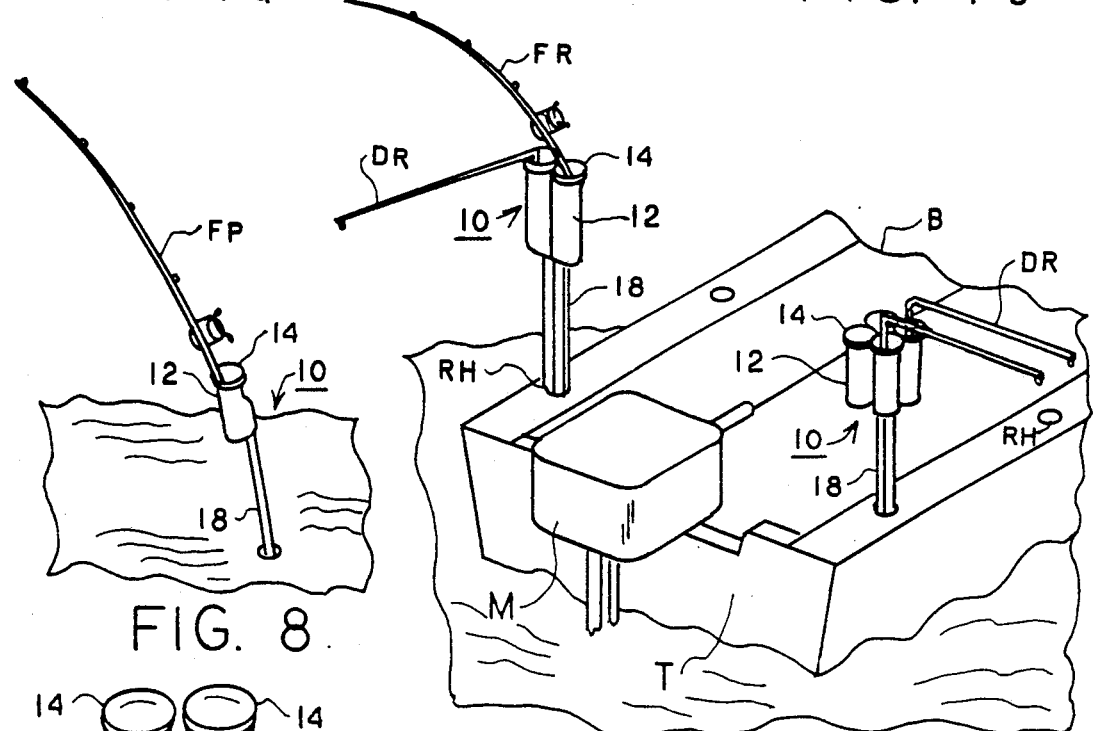
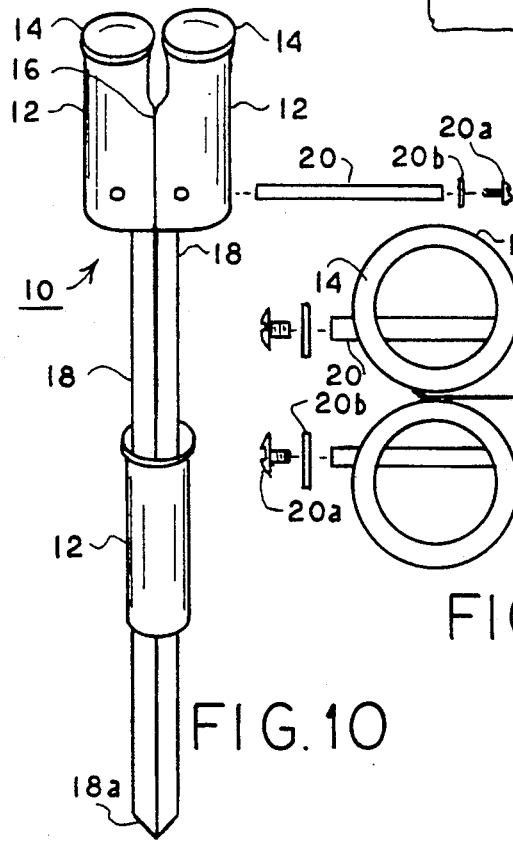
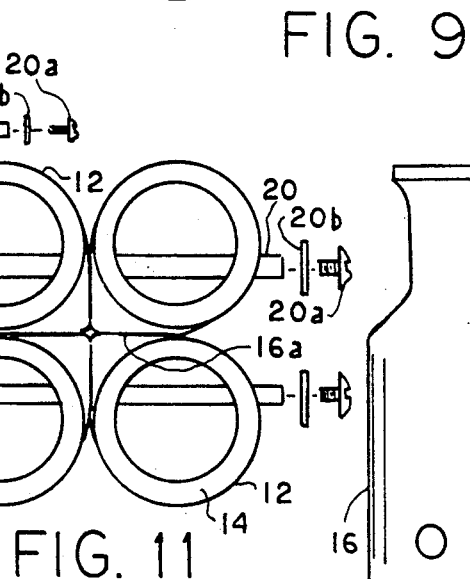
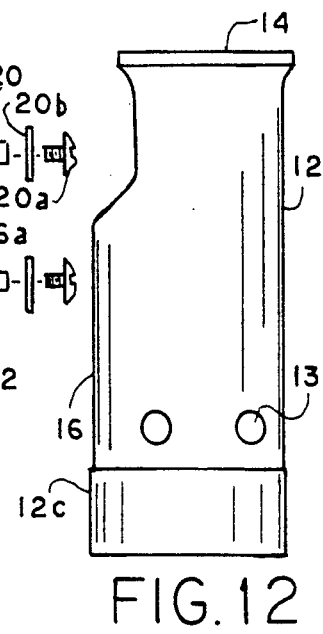

REMOVABLE ANCHOR FOR REMOVABLY RECEIVING AND SUPPORTING AN EXTERNAL MEMBER

BACKGROUND OF THE INVENTION

This invention relates to a receptacle device for removably receiving and supporting an external generally longitudinally extending utilization member and includes an electrically insulating body with a rigid support shaft extending away from the body.

Receptacle devices for removably receiving and supporting an external utilization member such as a fishing pole are known and have been used in the art. These receptacles typically take the form of a recessed cylindrical container provided in the upper horizontally extending surfaces of the side walls of a fishing boat. These devices also may take the form of a portable device wherein a metallic canister or cylindrical container is clamped or secured to a rod which is driven into the surface of the earth or into a riverbed between the banks of a river. These devices are utilized to retain a fishing pole or other fishing equipment to free the operator of the task of having to continuously hold the fishing pole. These devices have the disadvantages in that the fixed receptacles in the side walls of a fishing vessel will accommodate only one fishing pole or utilization device. Further, the portable devices, such as are used in a riverbed, have the disadvantage that a hazardous shock can be presented to the operator during the installation of the device if an underlying power or electrical cable is present below the riverbed. Further in the case of the portable devices, separate tools such as a hammer are necessary to install the device and in either case the devices do not accommodate more than one utilization device such as a fishing pole, or the like.

These and other disadvantages are overcome by the present invention wherein there is provided a receptacle device for removably receiving and supporting an external utilization member and which can be provided in a form to accommodate a plurality of utilization devices. In the case of a riverbed, the device provides a relatively safe method for its installation. Further, the receptacle device is inexpensive to manufacture and easy to assemble and install at a given location.

SUMMARY OF THE INVENTION

Briefly, a receptacle device for removably receiving and supporting an external generally longitudinally extending utilization member is provided. The device comprises a generally tubular receptacle body preferably of insulating material extending in a longitudinally extending direction and having a receiving opening at one end thereof. The body includes a support opening at and extending along its other end thereof. The axis of the support opening is spaced apart from and extends generally parallel to the axis of the receiving opening. A rigid longitudinally extending support shaft is insertable into the support opening to rigidly extend away from the receptacle device at the support opening and in the direction of the axis of the support opening. The support shaft anchors the receptacle device through an opening of an external surface. The body preferably comprises an electrically insulating or dielectric material. The free end of the support shaft preferably includes an integral auger bit to further facilitate the installation of the receptacle device.

BRIEF DESCRIPTION OF THE DRAWING

The advantages of this invention will become more readily appreciated as the same becomes completely understood by reference to the following detailed description was taken in conjunction with the accompanying drawing wherein:

FIG. 1 is a perspective view of the assembled receptacle device in accordance with the principles of the present invention;

FIG. 2 is a partial perspective view of the receptacle device of FIG. 1 illustrates one method for installing the device in an external surface;

FIG. 3 is an end view of the support shaft of the previous drawing figures illustrating its relationship to a typical installation support opening;

FIG. 4a is a cross-sectional view of the device according to FIG. 1;

FIG. 4b is a cross-sectional view taken along the line 4b—4b of FIG. 4a;

FIG. 5 is an end view of the support shaft of the previous drawing figures;

FIG. 6 is another cross-sectional view of the receptacle device of FIG. 1;

FIG. 7a is a partial plan view of the support shaft of the previous drawing figures illustrating in particular, the securing notch provided therein;

FIG. 7b is an end view of FIG. 7a taken along the line 7b—7b thereof;

FIGS. 8 and 9 illustrate typical installation applications of the receptacle device in accordance with the present invention;

FIGS. 10 and 11 illustrate plan views of the receptacle device in accordance with the present invention when provided in a multiple assembled configuration; and FIG. 12 is a plan view of the receptacle body of FIG. 1 further illustrating a support band which may be provided thereon.

DETAILED DESCRIPTION

Throughout the following detailed description of the drawing, like elements bear like reference numerals.

Turning now to FIG. 1 there is shown a perspective view of the receptacle device in accordance with the principles of the present invention. Device 10 includes a body of electrically insulating or dielectric material such as PVC, graphite, another plastic, or any other suitable material. If a graphite material is utilized, it is preferably covered with a layer of insulating material such as epoxy. Body 12 includes a receiving opening 14 which is provided as a flair face to accommodate the insertion of an external generally longitudinally extending utilization member. As will be described more fully hereinafter, body 12 comprises a double tube construction wherein an inner tube is coaxially provided within the body 12. Both the inner and outer tubes are provided with a riser portion 16 which portions provide a separation therebetween for accepting the angular configuration of a support shaft 18. Support shaft 18 is provided with an integral auger tip 18a which may be formed by cutting the terminal end portion of shaft 18 at a 45 degree angle to provide an integral auger bit. Support shaft 18 preferably comprises an aluminum material provided as angle stock and in one constructive embodiment comprised right-angle stock of a $\frac{3}{4} \times \frac{3}{4} \times \frac{1}{8}$ inch thickness material.

Still referring to FIG. 1, it can be seen that body 12 is provided with a plurality of through bores or openings 13 which provide a locking and holding function when a rod-like member 20 such as a ⅜ inch dowel pin or rod 20 is inserted therein. The opposite side of body 12 in FIG. 1 is provided with corresponding holes such that rod 20 can be extended through body 12 such as, for example, to secure support shaft 18 therein. Dowel rod 20 is restrained within body 12 by means of suitable fasteners such as screw 20a and washer 20b. That is, the outside diameter of washer 20b is greater than the diameter of rod 12 and the inside diameter of holes 13. As will be explained more fully hereinafter, when rod 20 is inserted through the upper pair of holes 13 as viewed in FIG. 1, the upper surface of rod 20, as viewed in FIG. 1, engages an arcuate cutout portion of support shaft 18.

Referring now to FIG. 2 there is shown a partial plan view of receptacle device 10 of FIG. 1 in the process of being installed in an external surface such as the earth or an ice bed I. Device 10 is installed by inserting or rotating support shaft 18 into and through the external surface such as ice I of FIG. 2. It can be seen that the auger bit provided by the terminal end 18a of support shaft 18 provides a cutting edge which develops a conical leading opening and thereafter a cylindrical opening as support shaft 18 is successively rotated in the directions R of FIG. 2.

Referring to FIG. 3 there is shown an end view of support shaft 18 and the cylindrical opening provided through the external surface which may be ice I or the earth during and after the installation process. It can be seen that the resulting cylindrical opening has a dimension A corresponding to twice the length of the side legs which form the cutting edges of support shaft 18. In one constructed embodiment, dimension A was 1½ inches corresponding to twice the leg dimension (¾ inches) of support shaft 18.

Referring now to FIG. 4a, there is shown a cross-sectional view of the receptacle device of FIG. 1. It can be seen the body 12 comprises an outer sleeve 12a and an inner sleeve or insert 12b to form a double-tube construction having riser portions 16 provided with a space therebetween for accepting and gripping the inserted end of support shaft 18. As can be seen by reference to FIG. 4a, the leading end of support shaft 18 includes an angled portion 18b which corresponds to the sloped portion of outer sleeve 12a and which facilitates the insertion of support shaft 18 within body 12.

Referring now to FIG. 4b there is shown a cross-sectional view taken along the line 4b—4b of FIG. 4a. It can be seen that risers 16a and 16b are provided with slopes of approximately 45 degrees, with respect to the center line defined by the radius of body 12 which intersects the apex of the riser portions, and are separated so as to accept support shaft 18 therebetween. This angular relationship accommodates the 45 degrees slopes of the legs of support shaft 18 as best illustrated in FIG. 5. The 45 degree slope of riser 16a on the external surface of body 12 further accommodates stacking or assembling two or more receptacle devices in side-by-side relationship as illustrated more clearly with respect to FIGS. 10 and 11. FIG. 4b further illustrates the quadrature or 45 degree relationship of the axes of holes 13 as provided at 45 and 135 degrees, etc. The holes are provided by drilling through the dual sleeve assembly with an appropriately sized drill bit such as a ⅜ inch drill bit when a ⅜ inch nominal OD locking dowel pin is utilized in the assembled configuration. These holes are preferably drilled in a direction parallel to the 90 degree axis of body 12 as illustrated in FIG. 4b. It can be seen that the dual-sleeve configuration provides a relatively secure press fit of support shaft 18 relative to body 12 which is further secured by the provision of locking dowel pin 20 as described more fully hereinafter with reference to FIG. 7a and 7b.

Referring now to FIG. 6 there is shown a cross-sectional view of device 10 of FIG. 1 which view is similar to the view provided in FIG. 4a but it is rotated 90 degrees in relationship thereto. As illustrated in FIG. 7a and FIG. 7b, support shaft 18 is provided with an arcuately cutout portion 18c which in one constructed embodiment comprised ¼ of the ⅜ inch radius of locking dowel pin 20. In this manner, and still referring to FIG. 6, it can be seen that locking dowel pin 20 is inserted through holes 13 and secured against removal from body 20 by means of fasteners 20a and 20b. The other two holes 13 of body 12 can be utilized to accept a second dowel pin 20 which may extend away from body 20 so as to accommodate the securing of an external device such as a pan fish line or a bait bucket, etc. As illustrated in FIGS. 4a and 6 flair face 14 is provided at the utilization device receiving end of body 12. In currently preferred practice the flair face is provided during the manufacturing process such as by advancing a flair head cam into the pre-cut and assembled inner and outer sleeves during the hot-mold manufacturing process. Similarly, riser portions 16a and 16b can be provided by inserting an inner sleeve riser die and an outer sleeve riser die respectively between a suitable mandrel and the inner sleeve, and the coaxially mounted inner and outer sleeves during the extrusion and manufacturing process.

Referring now to FIGS. 8 and 9 there are shown typical applications of the receptacle device in accordance with the teachings of the present invention. FIG. 8 illustrates the earth mounting of device 10 so as to accommodate a fishing pole FP or the like. It can be seen that support shaft 18 is driven into the ground or earth by applying the required pressure and/or rotation to body 12 which is provided of a suitable insulating or dielectric material such as PVC. FIG. 9 illustrates two applications of receptacle device 10 in accordance with the present invention. It can be seen that devices 10 are mounted to the existing rod holders R H which are provided in the horizontally extending surface of a side wall of a boat B. Boat B includes a motor M mounted to a transom T in a conventional manner. Devices 10 of FIG. 9 may accommodate one or more fishing poles FP or combination down riggers DR and fishing poles or any other suitable utilization devices which includes a generally longitudinally extending cooperating support member or handle.

FIG. 9 further illustrates the multiple pairing of devices 10 such as illustrated with respect to fishing pole F and as is further illustrated in FIG. 10. It can be seen that by reference to FIG. 10 that two or more receptacle devices 10 may be combined so as to accommodate multiple utilization devices. In this regard, the 45 degree slope provided along the outer surface 16a of riser portion 16 facilitates the pairing of receptacle devices 10. Further, a separate body member 12' can be provided so as to facilitate the assembly of two or more of devices 10. It can be seen that the single wall thickness of outer sleeve riser portions 16a of the paired bodies 12 give rise to a slight separation of support shafts 18.

Referring again to FIG. 9 there is shown, in the right-hand portion thereof, the pairing of four receptacle devices 10 so as to accommodate a corresponding number of external utilization devices such as downriggers DR, fishing poles FP and the like. As best illustrated in FIG. 11, the quadrature configuration of the riser surfaces of body 12 of device 10 facilitates the quadrature grouping of four receptacle devices 10. As illustrated in FIG. 11, the assembly can be secured by means of locking dowel pins 20 as described hereinbefore. It can be seen that the respective dowel pins extend through the 135, 45, 45 and finally 135 degree positions of holes 13.

Referring now to FIG. 12 there is shown a plan view of body 12 shown in conjunction with an additional support band 12c. Support band 12c may comprise stainless steel, a plated metallic member or any other suitable device to provide additional support to body 12 and to provide a decorative treatment.

What has been taught, then, is a receptacle device for receiving a generally longitudinally extending utilization member and comprising an electrically insulating or dielectric material to reduce electrical shock hazards when piercing a given surface or when used to support electrical devices. The receptacle device supports the utilization device above ground level by easily piercing the earth surface and provides the ability to drill into a frozen ice surface thereby to provide a free-standing support. The device also can be utilized to provide a land anchor to support small boats, canoes, and the like for land-to-water anchorage. The device also may be utilized as a beach umbrella support or a trail marker support, etc. The device can provide both a single point anchor and a multiple point anchor to accommodate, for example, four external utilization devices such as fishing poles or similar fishing equipment. The device also advantageously can be utilized by emergency vehicles for external mounting of warning lights, flags, stop signs, warning lights, and the like. The form of the invention illustrated and described herein is but one form of the invention in a form currently preferred for manufacture. It is shown as an example of the inventive concepts, however, rather than by way of limitation and is pointed out that various modification and alterations may be indulged in within the scope of the appended claims.

What is claimed is:

1. A receptacle device for removably receiving and supporting an external generally longitudinally extending utilization member, said device comprising, in combination:
   a generally tubular receptacle body of insulating material extending in a longitudinal direction and having a receiving opening at one end thereof, said body having an enclosed and electrically insulated support opening at and extending along its other end thereof, wherein the axis of said enclosed support opening is spaced apart from and extends generally parallel to the axis of said receiving opening; and,
   a rigid longitudinally extending support shaft insertable into said enclosed support opening to rigidly extend away from said receptacle device at said support opening in the direction of said axis of said support opening, for anchoring said receptacle device through an opening of an external surface, and, wherein said body comprises a dual sleeve of an extruded plastic configuration having an outer sleeve and an inner sleeve coaxially provided therein.

2. A receptacle device for removably receiving and supporting an external generally longitudinally extending utilization member, said device comprising, in combination:
   a generally tubular receptacle body of insulating material extending in a longitudinal direction and having a receiving opening at one end thereof, said body having a support opening at and extending along its other end thereof, wherein the axis of said support opening is spaced apart from and extends generally parallel to the axis of said receiving opening; and,
   a rigid longitudinally extending support shaft insertable into said support opening to rigidly extend away from said receptacle device at said support opening in the direction of said axis of said support opening, for anchoring said receptacle device through an opening of an external surface, wherein said body comprises a dual sleeve, extruded plastic configuration having an outer sleeve an inner sleeve coaxially provided therein, and wherein said outer sleeve includes a riser portion extending axially inwardly from said support opening for receiving said support shaft between said outer and inner sleeves.

3. The device according to claim 2, wherein said inner sleeve includes a riser portion spaced apart from and extending along said riser portion of said outer sleeve.

4. The device according to claim 3, wherein each riser portion is generally V-shaped in cross section which opens radially inwardly toward the axis of said body.

5. The device according to claim 4, wherein said support shaft is generally V-shaped in cross section corresponding to the separation between said risers.

6. The device according to claim 5, including a plurality of bores in said body aligned along a cross-sectional chord of said body for receiving a locking pin therein.

7. The device according to claim 5, wherein said support shaft includes a pair of arcuately cut out portions aligned with said chords.

8. The device according to claim 7, wherein said support shaft comprises an aluminum angle bar.

9. The device according to claim 8, wherein each leg of said angle bar is approximately ¾ inch in length.

10. The device according to claim 9, wherein the inside diameter of said body is approximately 1½ inches.

11. A method for manufacturing a receptacle device for removably receiving and supporting an external generally longitudinally extending utilization member, said device comprising a generally tubular receptacle body of insulating material extending in a longitudinal direction and having a receiving opening at one end thereof, said body having a support opening at and extending along its other end thereof, wherein the axis of said support opening is spaced apart from and extends generally parallel to the axis of said receiving opening, and a rigid longitudinally extending support shaft insertable into said support opening to rigidly extend away from said receptacle device at said support opening in the direction of said axis of said support opening, for anchoring said receptacle device through an opening of an external surface, said method comprising the steps of:

providing a body comprising an outer sleeve of a predetermined length with an inner sleeve coaxially disposed therein;

heating said outer and inner sleeves;

engaging one end of said coaxial outer and inner sleeves with a tapered tool to flair said one end radially outwardly;

advancing a first riser die into the other end of said outer and inner sleeves to form a riser in said outer and inner sleeves extending axially inwardly from said support opening; and, advancing a second riser die into the formed riser in said outer and inner and between said outer and inner sleeves to provide a predetermined separation between the riser portions of said outer and inner sleeves thereby to accept said support shaft therein.

12. The method according to claim 11, wherein the riser portion of said outer sleeve is generally V-shaped and wherein the riser portion of said inner sleeve is generally V-shaped and nested within the V-shaped portion of said outer sleeve with a predetermined separation therebetween.

13. The method according to claim 12, wherein said support shaft is generally V-shaped in cross section corresponding to the separation between said outer and inner sleeves.

14. The method according to claim 11, including the step of providing a through bore in said body in a generally transverse direction relative to the axis of said body for receiving a locking pin to retain said support shaft in said body.

15. A receptacle device for removably receiving and supporting an external generally longitudinally extending utilization member, said device comprising, in combination:

a generally tubular receptacle body extending in a longitudinal direction and having a receiving opening at one end thereof, said body having a support opening at and extending along its other end thereof, wherein the axis of said support opening is spaced apart from and extends generally parallel to the axis of said receiving opening, a rigid longitudinally extending support shaft insertable into said support opening to rigidly extend away from said receptacle device at said support opening in the direction of said axis of said support opening, for anchoring said receptacle device through an opening of an external surface; and, wherein said body comprises an outer sleeve and an inner sleeve coaxially provided therein and wherein said outer sleeve includes a riser portion extending axially inwardly from said support opening for receiving said support shaft between said outer and inner sleeves.

16. The device according to claim 15, wherein said riser portion is generally V-shaped in cross section which opens radially inwardly toward the axis of said body and wherein the legs of said riser portion are sloped at an angle of approximately 45 degrees with respect to the radius of said body which intersects the apex of said riser portion.

17. The device according to claim 16, wherein said support shaft is a right-angle bar stock shaft the legs of which are approximately ¾ inch and wherein the inside diameter of said inner sleeve is approximately 1½ inches.

18. The device according to claim 15, wherein said body comprises a dielectric material.

* * * * *